United States Patent Office 3,050,440
Patented Aug. 21, 1962

3,050,440
NEW FUNGICIDAL COMPOSITIONS OF MATTER
Sidney B. Richter, Chicago, Ill., assignor to Velsicol Chemical Corporation, Chicago, Ill., a corporation of Illinois
No Drawing. Filed Oct. 13, 1960, Ser. No. 62,318
2 Claims. (Cl. 167—30)

This invention relates to new polychloronitrodiphenyl compounds and more particularly to polychloronitrodiphenyl ether, sulfide, sulfone, and sulfoxide compounds possessing properties which provide superior protection against fungus growths.

The new novel compounds of the present invention have the following structure:

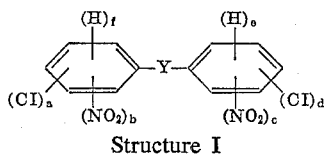

Structure I wherein Y is selected from the group consisting of O, S, SO and $SO_2$; $a$ is an integer from 1 to 4, $b$ is an integer from 1 to 3; $c$ is an integer from 0 to 2, the sum of $b$ and $c$ being a maximum of 3; $d$ is an integer from 2 to 5, the sum of $a$ and $d$ being larger than 5; and $e$ and $f$ are integers from 0 to 3, the sums of $a$, $b$ and $f$, and $c$, $d$, and $e$ each being 5.

It is one object of the present invention to provide new polychlorinated nitrodiphenyl derivatives, which are useful in the control of fungus growths.

Another object of the present invention is to provide fungicides of low phytotoxicity suitable for use in agriculture.

These and other objects of the present invention will be readily apparent from the ensuing description.

The ether compounds of the present invention can be prepared by one or more of the condensation, chlorination and nitration procedures known to the art. The ether compounds of the present invention which have symmetrical phenyl rings, save of a nitro group, can readily be prepared by reacting corresponding substituted anisole or phenetole with fuming nitric acid and recovering the diphenyl ether compound thereform. By means of this procedure an almost symmetrical diphenyl ether is formed with a newly substituted nitro group in a position on one of the rings according to the directing influence of those groups already attached to the ring.

The ether compounds of the present invention can also be readily prepared by a process analogous to the Williamson synthesis. By this method, a substituted potassium phenolate is reacted with a substituted halobenzene. For example, the reaction of potassium 2-chloro-4-nitrophenolate with 2,3,4,5,6-pentachlorobromobenzene yields 2-chloro-4-nitrophenyl 2,3,4,5,6-pentachlorophenyl ether. It should be noted that the nitro group may be present in either the phenolate or the halobenzene reactant, or both, depending upon the particular product desired.

When neither reactant contains a nitro radical, and the latter is to be added by a subsequent substitution reaction, a catalyst should be utilized to accelerate the coupling reaction. Copper is a suitable catalytic material, especially in the form of copper-bronze.

Another procedure useful in preparing the ether compounds of this invention is to prepare a lower chloro- and/or nitro-substituted diphenyl ether compound and successively chlorinate and/or nitrate until the desired compound is prepared.

The sulfide compounds of the present invention can also readily be prepared by a procedure analogous to the Williamson synthesis. A substituted phenyl mercaptan is prepared which is reacted with an alkali metal hydroxide, such as potassium hydroxide, to form an alkali metal salt of the mercaptan. This latter intermediate product is reacted with a substituted phenyl halide, such as a substituted phenyl bromide, to yield the desired polychloronitrodiphenyl-sulfide. For example, 2,3,4-trichloro-6-nitrophenyl 2,3,5,6-tetrachlorophenyl sulfide can be prepared by the above process from the reactants 2,3,4-trichloro-6-nitrophenyl mercaptan and 2,3,5,6-tetrachlorophenyl bromide.

The sulfide compounds described herein can also be prepared by the interaction of an alkali metal salt of a substituted phenyl mercaptan, described in the previous method, with a substituted diazonium chloride.

Symmetrical polychloronitrodiphenyl sulfides of this invention can also be prepared by the thermal decomposition of a lead salt of a polychloronitrophenyl mercaptan. Alternatively, the symmetrical sulfide compounds can be prepared by the oxidation of the said class of mercaptans with chromic acid or in ammoniacal solution by contact with air.

Examples of symmetrical sulfides of this invention which can be prepared by the above methods are: 2,4,6-trichloro-3-nitrophenyl 2,4,6-trichloro-3-nitrophenyl sulfide; 2,3,4-trichloro-5-nitrophenyl 2,3,4-trichloro-5-nitrophenyl sulfide; 3,4,5-trichloro-2-nitrophenyl 3,4,5-trichloro-2-nitrophenyl sulfide; 2,3,4,5-tetrachloro-6-nitrophenyl 2,3,4,5-tetrachloro-6-nitrophenyl sulfide; and 2,3,4,6-tetrachloro-5-nitrophenyl 2,3,4,6-tetrachloro-5-nitrophenyl sulfide.

Although sulfoxides, such as diphenyl sulfoxide, can be prepared by the reaction of an aromatic compound, such as benzene, and thionyl chloride in the presence of aluminum chloride, such procedure is not preferred for the preparation of the sulfoxide compounds of the present invention due to the formation of by-products. It is preferred to prepare the sulfoxides of this invention by partial oxidation of the corresponding sulfide or by partial reduction of the corresponding sulfone.

In the preferred method, the sulfide of this invention is partially oxidized to the sulfoxide by the aid of a mild oxidizing agent, such as nitric acid, hydrogen peroxide in acetic acid solution, or nitric oxide. Thus, 2,3,5-trichloro-4-nitrophenyl 2,3,5,6-tetrachlorophenyl sulfoxide can be prepared by gently boiling 2,3,5-trichloro-4-nitrophenyl 2,3,5,6-tetrachlorophenyl sulfide with five times its weight of 3 N nitric acid for fifteen hours, separating the sulfoxide compound by pouring the reaction mixture into ice-water, and recovering the product by filtration therefrom. Similarly, 2,3,6-trichloro-4-nitrophenyl 2,3,5,6-tetrachloro-4-nitrophenyl sulfoxide can be prepared by contacting 2,3,6-trichloro-4-nitrophenyl 2',3',5',6'-tetrachloro-4-nitrophenyl sulfide with hydrogen peroxide in acetic acid solution at room temperature.

The polychloronitrodiphenyl sulfones of the present invention can be readily prepared by oxidation of the corresponding sulfide or sulfoxide. Suitable oxidizing agents for said oxidation are fuming nitric acid, potassium permanganate, hypochlorous acid, sodium hypochlorite, chromic acid, and hydrogen peroxide.

The new hexachloronitrodiphenyl ether compounds of the present invention represented by the structure I, wherein Y is O, $b$ is 1, $c$ is zero, the sum of $a$ and $d$ is 6, and the sum of $e$ and $f$ is 3, include:

3-nitro-4-chlorophenyl 2,3,4,5,6-pentachlorophenyl ether;
2-chloro4-nitrophenyl 2,3,4,5,6-pentachlorophenyl ether;
2,3-dichloro-4-nitrophenyl 2,3,5,6-tetrachlorophenyl ether;
2,6-dichloro-4-nitrophenyl 2,3,5,6-tetrachlorophenyl ether;
2,4-dichloro-5-nitrophenyl 2,3,4,6-tetrachlorophenyl ether;
3,4-dichloro-6-nitrophenyl 2,3,4,6-tetrachlorophenyl ether;

2,3,4-trichloro-6-nitrophenyl 2,3,4-trichlorophenyl ether;
2,3,6-trichloro-4-nitrophenyl 2,3,5-trichlorophenyl ether;
2,3,6-trichloro-5-nitrophenyl 2,3,6-trichlorophenyl ether;
3,4,5-trichloro-2-nitrophenyl 3,4,5-trichlorophenyl ether;
2,3,4,6-tetrachloro-5-nitrophenyl 2,3-dichlorophenyl ether;
2,3,5,6-tetrachloro-4-nitrophenyl 2,4-dichlorophenyl ether;
2,3,4,6-tetrachloro-5-nitrophenyl 2,5-dichlorophenyl ether; and 2,3,5,6-tetrachloro-4-nitrophenyl 3,4-dichlorophenyl ether.

It is understood that the above diphenyl configurations apply equally to the corresponding sulfides, sulfoxides and sulfones, by the substitution of S, SO, and $SO_2$, respectively, for Y in the said configurations. For example, a hexachloronitrodiphenyl sulfoxide having the structure I, wherein Y is SO, $b$ is 1, $c$ is zero, the sum of $a$ and $d$ is 6, and the sum of $e$ and $f$ is 3, is: 3-nitro-4-chlorophenyl 2,3,4,5,6-pentachlorophenyl sulfoxide.

Among the heptachloronitrodiphenyl sulfide compounds of this invention represented by structure I, wherein Y is S, $b$ is 1, $c$ is zero, the sum of $a$ and $d$ is 7, and the sum of $e$ and $f$ is 2, are:

2,6-dichloro-4-nitrophenyl 2,3,4,5,6-pentachlorophenyl sulfide;
2,4-dichloro-3-nitrophenyl 2,3,4,5,6-pentachlorophenyl sulfide;
3,5-dichloro-2-nitrophenyl 2,3,4,5,6-pentachlorophenyl sulfide;
2,3,4-trichloro-6-nitrophenyl 2,3,5,6-tetrachlorophenyl sulfide;
2,3,6-trichloro-4-nitrophenyl 2,3,4,6-tetrachlorophenyl sulfide;
2,3,5-trichloro-4-nitrophenyl 2,3,4,5-tetrachlorophenyl sulfide;
3,4,5-trichloro-2-nitrophenyl 2,3,4,5-tetrachlorophenyl sulfide;
2,3,4,6-tetrachloro-5-nitrophenyl 2,3,4-trichlorophenyl sulfide;
2,3,4,5-tetrachloro-6-nitrophenyl 2,3,6-trichlorophenyl sulfide;
2,3,4,6-tetrachloro-5-nitrophenyl 2,3,5-trichlorophenyl sulfide; and
2,3,5,6-tetrachloro-4-nitrophenyl 3,4,5-trichlorophenyl sulfide.

Similarly, the corresponding ethers, sulfoxides, and sulfones, may have the same configuration as the above compounds by the substitution of O, SO, and $SO_2$, respectively, for Y in the said configurations. For example, a heptachloronitrodiphenyl sulfone having the structure I, wherein Y is $SO_2$, $b$ is 1, $c$ is zero, the sum of $a$ and $d$ is 7, and the sum of $e$ and $f$ is 2, is: 2,3,4-trichloro-6-nitrophenyl 2,3,5,6-tetrachlorophenyl ether.

Examples of the new octachloronitrodiphenyl sulfoxide compounds represented by structure I, wherein Y is SO, $b$ is 1, $c$ is zero, the sum of $a$ and $d$ is 8, and the sum of $e$ and $f$ is 1, are:

2,3,6-trichloro-4-nitrophenyl 2,3,4,5,6-pentachlorophenyl sulfoxide;
2,3,5-trichloro-4-nitrophenyl 2,3,4,5,6-phentachlorophenyl sulfoxide;
3,4,5-trichloro-2- nitrophenyl 2,3,4,5,6-pentachlorophenyl sulfoxide;
2,3,4,6-tetrachloro-5-nitrophenyl 2,3,5,6-tetrachlorophenyl sulfoxide;
2,3,5,6-tetrachloro-4-nitrophenyl 2,3,5,6-tetrachlorophenyl sulfoxide;
2,3,4,5-tetrachloro-6-nitrophenyl 2,3,4,6-tetrachlorophenyl sulfoxide; and
2,3,4,5-tetrachloro-6-nitrophenyl 2,3,4,5-tetrachlorophenyl sulfoxide.

These configurations apply equally to the ether, sulfide, and sulfone compounds of this invention, which may have the same configuration by the substitution of O, S, and $SO_2$, respectively, for Y in the structure described above. One example of an octachloronitrodiphenyl ether having structure I, wherein Y is O, $b$ is 1, $c$ is zero, the sum of $a$ and $d$ is 8, and the sum of $e$ and $f$ is 1, is: 2,3,6-trichloro-4-nitrophenyl 2,3,4,5,6-pentachlorophenyl ether.

Included among the new nonachloronitrodiphenyl sulfones, represented by structure I, where Y is $SO_2$; $a$ is 4; $d$ is 5; $b$ is 1; and $c$, $e$, and $f$ are zero, are: 2,3,5,6-tetrachloro - 4 - nitrophenyl 2,3,4,5,6-pentachlorophenyl sulfone; 2,3,4,6-tetrachloro-5-nitrophenyl 2,3,4,5,6-pentachlorophenyl sulfone; and 2,3,4,5-tetrachloro-6-nitrophenyl 2,3,4,5,6-pentachlorophenyl sulfone. Likewise the new nonachloronitrodiphenyl ethers, sulfides, and sulfoxides may be represented by structure I, wherein Y is O, S, and SO, respectively; $a$ is 4; $b$ is 1; $d$ is 5; and $c$, $e$, and $f$ are zero.

Examples of the new hexachlorodinitrodiphenyl ether compounds of the present invention represented by structure I, wherein Y is O, the sum of $a$ and $d$ is 6, the sum of $b$ and $c$ is 2, and the sum of $e$ and $f$ is 2, are:

3,5-dichloro-4-nitrophenyl 2,3,5,6-tetrachloro-4-nitrophenyl ether;
2,3-dichloro-4-nitrophenyl 2,3,5,6-tetrachloro-4-nitrophenyl ether;
2,4-dichloro-5-nitrophenyl 2,3,4,6-tetrachloro-5-nitrophenyl ether;
2,6-dichloro-4-nitrophenyl 2,3,4,5-tetrachloro-5-nitrophenyl ether;
2,6-dichloro-4-nitrophenyl 2,3,4,5-tetrachloro-6-nitrophenyl ether;
2,3,4-trichloro-6-nitrophenyl 2,3,4-trichloro-6-nitrophenyl ether;
2,4,6-trichloro-5-nitrophenyl 2,3,5-trichloro-4-nitrophenyl ether;
2,4,5-trichloro-6-nitrophenyl 2,3,6-trichloro-4-nitrophenyl ether;
3,4,5-trichloro-2-nitrophenyl 3,4,5-trichloro-2-nitrophenyl ether;
3,5-dichloro-2,4-dinitrophenyl 2,3,4,6-tetrachlorophenyl ether; and
3,5,6-trichloro-2,4 - dinitrophenyl 2,3,5 - trichlorophenyl ether.

It is understood that the above configurations apply equally to the corresponding sulfides, sulfoxides, and sulfones, by the substitution of S, SO, and $SO_2$, respectively, for Y in the above examples. 3,5-dichloro-4-nitrophenyl 2,3,5,6-tetrachloro-4-nitrophenyl sulfone is an example of a hexachlorodinitrophenyl sulfone having the structure I, wherein Y is $SO_2$, the sum of $a$ and $d$ is 6, the sum of $b$ and $c$ is 2, and the sum of $e$ and $f$ is 2.

The new sulfoxide compounds of the present invention include heptachlorodinitrodiphenyl sulfoxide compounds represented by the structure I, wherein Y is SO, $a$ is 3, the sum of $b$ and $c$ is 2, $c$ is 4, and the sum of $e$ and $f$ is 1, such as: 2,3,4-trichloro-6-nitrophenyl 2,3,5,6-tetrachloro-4-nitrophenyl sulfoxide; 2,3,6-trichloro-4-nitrophenyl 2,3,4,6-tetrachloro-5-nitrophenyl sulfoxide; 2,4,6-trichloro-3-nitrophenyl 2,3,4,6-tetrachloro-5-nitrophenyl sulfoxide; 3,4,5-trichloro-2-nitrophenyl 2,3,4,5-tetrachloro-6-nitrophenyl sulfoxide; 2,3,4-trichloro-5-nitrophenyl 2,3,4,6-tetrachloro-5-nitrophenyl sulfoxide; 2,3,5-trichloro-4,6-dinitrophenyl 2,3,4,6-tetrachlorophenyl sulfoxide; and octachlorodinitrodiphenyl sulfoxide compounds represented by structure I, wherein Y is SO, $a$ and $d$ are each 4, $b$ and $c$ are each 1, and $e$ and $f$ are both zero, such as: 2,3,4,6-tetrachloro-5-nitrophenyl 2,3,5,6-tetrachloro-4-nitrophenyl sulfoxide; 2,3,5,6-tetrachloro-4-nitrophenyl 2,3,5,6 - tetrachloro - 4-nitrophenyl sulfoxide; and 2,3,4,5-tetrachloro-6-nitrophenyl 2,3,4,6-tetrachloro-5-nitrophenyl sulfoxide.

Similarly, the new ether, sulfide, and sulfone compounds of the present invention may have the above configurations by substituting O, S, and $SO_2$, respectively, for Y in the above configurations. For example, 2,4,6-trichloro-3-nitrophenyl 2,3,4,6-tetrachloro - 5 - nitrophenyl ether is a heptachlorodinitrodiphenyl ether having structure I, wherein Y is O, $a$ is 3, $b$, $c$, and $f$ are each 1, $c$ is 4, and $e$ is zero.

Among the hexachlorotrinitrodiphenyl sulfide compounds of the present invention are those represented by structure I, where Y is S, $a$ and $d$ are each 3, $b$ is 1, $c$ is 2, $e$ is zero, and $f$ is 1, such as: 2,3,4-trichloro-6-nitrophenyl 2,3,5-trichloro-4,6-dinitrophenyl sulfide; 2,3,5-trichloro-4-nitrophenyl 2,4,6-trichloro-3,5-dinitrophenyl sulfide; and 3,4,5-trichloro-2-nitrophenyl 2,4,6-trichloro-3,5-dinitrophenyl sulfide; those represented by structure I, where Y is S, $a$ is 4, $b$ is 1, $c$ and $d$ are each 2, $e$ is 1, and $f$ is zero, such as: 2,3,4,6-tetrachloro-5-nitrophenyl 2,3-dichloro-4,6-dinitrophenyl sulfide; 2,3,5,6-tetrachloro-4-nitrophenyl 2,4-dichloro-3,5-dinitrophenyl sulfide; 2,3,4,5-tetrachloro-6-nitrophenyl 3,5-dichloro-2,4-dinitrophenyl sulfide; and 2,3,5,6-tetrachloro-4-nitrophenyl 3,5-dichloro-2,6-dinitrophenyl sulfide; and those represented by structure I, wherein Y is S, $a$ is 2, $b$ is 3, $c$ and $f$ are each zero, $d$ is 4, and $e$ is 1, such as: 3,5-dichloro-2,4,6-trinitrophenyl 2,3,5,6-tetrachlorophenyl sulfide.

The above configurations apply equally to the ethers, sulfoxides, and sulfones, of this invention and may be represented by structure I wherein Y is O, SO, and $SO_2$, respectively, the sum of $a$ and $d$ is 6, the sum of $b$ and $c$ is 3, and the sum of $e$ and $f$ is 1. An example of a sulfone of structure I, wherein Y is $SO_2$, $a$ and $d$ are each 3, $b$ is 1, $c$ is 2, $e$ is zero, and $f$ is 1, is: 3,4,5-trichloro-2-nitrophenyl 2,4,6-trichloro-3,5-dinitrophenyl sulfone; while an example of an ether of structure I, wherein Y is O, $a$ is 4, $b$ is 1, $c$ and $d$ are each 2, $e$ is 1, and $f$ is zero, is: 2,3,4-trichloro-6-nitrophenyl 2,3,4-trichloro-5,6-dinitrophenyl ether.

Examples of the new heptachlorotrinitrodiphenyl ether compounds of the present invention represented by structure I, wherein Y is O, $a$ is 4, $b$ is 1, $c$ is 2, $d$ is 3, and $e$ and $f$ are each zero, are: 2,3,4,6-tetrachloro-5-nitrophenyl 2,3,4-trichloro-5,6-dinitrophenyl ether; 2,3,4,5-tetrachloro-6-nitrophenyl 2,3,5-trichloro-4,6-dinitrophenyl ether; and 2,3,5,6-tetrachloro-4-nitrophenyl 2,4,6-trichloro-3,5-dinitrophenyl ether.

Similarly, the new sulfide, sulfoxide, and sulfone compounds of the present invention may have the above configurations by substituting S, SO, and $SO_2$, respectively, for Y in the above configuration. For example, 2,3,5,6-tetrachloro-4-nitrophenyl 2,3,4-trichloro-5,6-dinitrophenyl sulfoxide is a heptachlorotrinitrodiphenyl sulfoxide having structure I, wherein Y is SO, $a$ is 4, $b$ is 2, $c$ is 3, and $d$ and $e$ are each zero.

The new heptachloronitrodiphenyl ether compounds of the present invention also include those represented by structure I, wherein Y is O, $a$ is 2, $b$ is 3, $c$, $e$, and $f$ are each zero, and $d$ is 5, such as: 3,5-dichloro-2,4,6-trinitrophenyl 2,3,4,5,6-pentachlorophenyl ether. Similarly, the sulfide, sulfoxide and sulfone compounds of this invention may also have this configuration by substituting S, SO, $SO_2$, respectively, for Y in structure I, wherein $a$, $b$, $c$, $d$, $e$ and $f$ are as specified.

The following examples are presented by way of illustration of the preparation of the compounds of the present invention and are not intended to limit the scope of this invention:

EXAMPLE 1

*Preparation of 2,6-Dinitro-3,5-Dichlorophenyl 2,3,4,5,6-Pentachlorophenyl Ether*

Pentachlorophenol (266.5 g.; 1 mol), which can be prepared as described by Fichter and Glantzstein, Ber., 49, p. 2480 (1916), is dissolved in ethanol (1 liter). The solution is placed in a 2-liter three-necked round-bottom flask equipped with mechanical stirrer, reflux condenser, and thermometer. A concentrated solution (50% by weight) of potassium hydroxide (56 g.; 1 mol) in water is added to form the potassium phenolate. 2,4,6-trichloro-1,3-dinitrobenzene (271.5 g.; 1 mol), which can be prepared as described by Jackson and Wing, Am. Chem. J., 9, p. 353 (1887), is added to the flask and the contents are heated, with stirring, by means of a heating mantle. The mixture is refluxed until the precipitation of potassium chloride ceases.

The reaction mixture is poured into ice-water (1 liter). The water mixture is filtered and the precipitate is filtered from the wash water, washed with water, and dried in a vacuum oven. The product therefrom is crude 2,6-dinitro - 3,5 - dichlorophenyl 2,3,4,5,6-pentachlorophenyl ether. The crude product can be used as such or can be purified by recrystallizing from a suitable solvent.

EXAMPLE 2

*Preparation of 4-Chloro-2-Nitrophenyl 2,3,4,5,6-Pentachlorophenyl Sulfide*

Pentachloroaniline (265.5 g., 1 mol), which can be prepared as described by Willegerodt and Wilcke, Ber. 43, p. 2754 (1910), is suspended in concentrated hydrochloric acid (100 cc.) in a 1-liter three-necked round-bottom flask equipped with a mechanical stirrer, thermometer, and Dry-Ice-acetone cooling bath. The contents of the flask are cooled to 0° C. and a cold aqueous 5% solution of sodium nitrite (69 g., 1 mol) is added with stirring at a rate such that the temperature does not rise above 5° C., 4-chloro-2-nitrothiophenol (189.5 g., 1 mol) is dissolved in an aqueous solution (100 cc.) of sodium hydroxide (40 g., 1 mol). This solution is cooled to about 0° C. and slowly added with stirring to the cold solution in the flask. The mixture is stirred and the temperature is gradually increased to 60° C., during which time nitrogen is evolved from the mixture. When the evolution of nitrogen has ceased, the reaction mixture is cooled, and the precipitate filtered therefrom. The precipitate is dried in a vacuum oven. The precipitate is the crude product 4-chloro-2-nitrophenyl 2,3,4,5,6-pentachlorophenyl sulfide. The crude product can be used as such, or can be purified by recrystallizing from a suitable solvent.

EXAMPLE 3

*Preparation of 4-Chloro-2-Nitrophenyl 2,3,4,5,6-Pentachlorophenyl Sulfoxide*

Purified product of Example 2 (12 g., 0.03 mol) is added dropwise to nitric acid (50 cc. of 1.35–1.42 specific gravity) and the solution is stirred for one hour at room temperature. The solution is poured into water (approximately one-liter) and the precipitate is filtered therefrom, and dried in a vacuum oven for about 6 hours at a medium temperature (about 50° C.). The precipitate is the product 4-chloro-2-nitrophenyl 2,3,4,5,6-pentachlorophenyl sulfoxide, and can be used as such, or can be purified by recrystallizing from a suitable solvent.

EXAMPLE 4

*Preparation of 4-Chloro-2-Nitrophenyl 2,3,4,5,6-Pentachlorophenyl Sulfone*

Purified product of Example 2 (25 g., 0.06 mol) is placed into a 200 cc. three-necked round-bottom flask equipped with mechanical stirrer and reflux condenser. Glacial acetic acid is added in small portions until the product of Example 2 just dissolves. Hydrogen peroxide (50 cc. of a 30% solution in water) is added and the flask is heated on a steam bath for four hours. The flask is cooled to room temperature and its contents are poured into water (3 liters). The precipitate is filtered from the aqueous filtrate, washed with water (100 cc.), refiltered, and dried in a vacuum oven for about 6 hours at a medium temperature (about 50° C.). The precipitate is the product 4-chloro-2-nitrophenyl 2,3,4,5,6-pentachlorophenyl sulfone and can be used as such, or can be purified by recrystallizing from a suitable solvent.

The compounds of the present invention are important and valuable because of their pesticidal characteristics, especially those relating to the killing of and inhibition of growth of a wide variety of fungi:

The need for efficient and economical fungicidal and fungistatal compositions in the fields of agriculture, paper making, clothing, adhesives, leather goods, etc., is very great and while various organic fungicides and fungistats are known and utilized, such materials are generally deficient in the various concomitant characteristics necessary for satisfactory, economic commercial usage.

The use of fungicides in agriculture is very important. The destruction of various food crops by fungus growths can be measured in the millions of dollars annually. Since fungi are themselves a low order of plant life, it is not unusual nor surprising that a material which will control the growth of, or kill fungi will also adversely affect the growing or stored crops which are the host plants. A fungicide which destroys the crop at the same time that it destroys the fungus has no value for such use even though its fungicidal activity is very great. It is therefore important that agricultural fungicides exhibit little or no phytotoxicity under the conditions utilized for fungus control, and such is the case with the present compounds.

The active fungicidal material of this invention is advantageously utilized with a suitable carrier or diluent to provide compositions in the form of aqueous dispersions or emulsions, water dispersible powders, dusts, organic spraying solutions, and the like. Aqueous dispersions and emulsions of the compounds of this invention are readily prepared by dissolving the fungicidal compounds in a suitable inert liquid solvent, such as acetone, and then diluting with water to the desired concentration. The dry formulations, i.e., dust bases or concentrates, wettable powders, and granular formulations, of the compounds of the present invention are prepared by blending the compounds described herein with any of the solid carriers and diluents commonly known to the art of pesticide formulations, and exemplified by clays, diatomaceous earths, talcs, chalks, and the like.

Typical concentrates for aqueous dispersions and emulsions will contain from about 0.5% to about 15% by weight of fungicidally toxic compound based on the total weight of the solution. Dust bases or concentrates will typically contain from about 10% to about 70% of toxic compound based on the total weight of dry blend and may contain suitable quantities of wetting agents, dispersing agents, and synergists. Similarly, wettable powders will also contain from about 10% to about 70% by weight of fungicidal material. Granular formulations typically contain from about 2% to about 40% active fungicidal ingredient by weight. These fungicide formulations are diluted with water or solid diluents and sprayed or dusted on the plants to be protected. Alternatively, the soil in which the plant is growing may be treated with excellent results.

Articles other than plants which are to be treated, such as leather goods, clothing, wood products, and the like, may be sprayed or dusted, and in addition thereto may also be dipped in aqueous or organic solutions of the compounds of the present invention.

I claim:

1. A fungicidal composition comprising an inert carrier and a fungicidal toxic amount of a compound of the formula

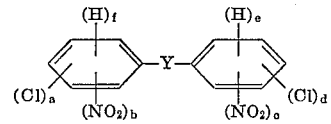

wherein Y is selected from the group consisting of O, S, SO and $SO_2$; $a$ is an integer from 1 to 4, $b$ is an integer from 1 to 3; $c$ is an integer from 0 to 2; the sum of $b$ and $c$ being a maximum of 3; $d$ is an integer from 2 to 5, the sum of $a$ and $d$ being larger than 5; and $e$ and $f$ are integers from 0 to 3, the sums of $a$, $b$ and $f$, and $c$, $d$ and $e$ each being 5.

2. The method of controlling fungus growths which comprises applying to fungi and their places of growth a fungicidal toxic amount of a compound of the formula

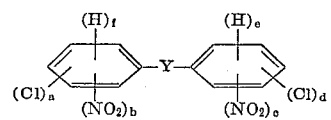

wherein Y is selected from the group consisting of O, S, SO and $SO_2$; $a$ is an integer from 1 to 4, $b$ is an integer from 1 to 3; $c$ is an integer from 0 to 2; the sum of $b$ and $c$ being a maximum of 3; $d$ is an integer from 2 to 5, the sum of $a$ and $d$ being larger than 5; and $e$ and $f$ are integers from 0 to 3, the sums of $a$, $b$ and $f$, and $c$, $d$ and $e$ each being 5.

References Cited in the file of this patent

UNITED STATES PATENTS

| | | |
|---|---|---|
| 1,835,394 | Hentrich et al. | Dec. 8, 1931 |
| 2,812,281 | Meltzer | Nov. 5, 1951 |

OTHER REFERENCES

Groves et al.: J. Chem. Soc. 1929, 512–524.
Speckling et al.: Comp. Rend. 231, 228–9 (1950).

UNITED STATES PATENT OFFICE
CERTIFICATE OF CORRECTION

Patent No. 3,050,440                                August 21, 1962

Sidney B. Richter

It is hereby certified that error appears in the above numbered patent requiring correction and that the said Letters Patent should read as corrected below.

Column 3, line 52, for "ether" read -- sulfone --; lines 59 and 60, for "phentachlorophenyl" read -- pentachlorophenyl --; column 4, line 26, for "2,3,4,5-tetrachloro" read -- 2,3,4,6-tetrachloro --; column 5, line 57, after "SO," insert -- and --.

Signed and sealed this 14th day of May 1963.

(SEAL)
Attest:

ERNEST W. SWIDER
Attesting Officer

DAVID L. LADD
Commissioner of Patents